ELASTOMER-SILICA PIGMENT WET MASTER-
BATCHING AND WET MASTERBATCHES
Oliver W. Burke, Jr., Fort Lauderdale, Fla.
(1510 SW. 13th Court, Pompano Beach, Fla. 33060)
No Drawing. Continuation-in-part of application Ser. No.
458,420, May 24, 1965. This application Jan. 24, 1967,
Ser. No. 611,250
Int. Cl. C08d 7/04
U.S. Cl. 260—29.7
9 Claims

ABSTRACT OF THE DISCLOSURE

The chemistry and mechanics employed in producing wet masterbatches by combining rubbery materials with or without processing oil as aqueous dispersions and/or solvent solutions with aqueous slurries of wet silica pigment that has a content of bound alkali and contents of bound and retained water, are concerned. The chemical procedures prepare aqueous silica pigment-elastomer masterbatches having serum essentially free of silica pigment. The mechanical processes reduce the amount of serum retained in the wet co-coagulated masterbatch, thus reducing the drying load. Processes combining such chemical and mechanical procedures are disclosed as are the improved masterbatches including those from polar-grafted hydrocarbon elastomers.

CROSS REFERENCES TO RELATED APPLICATIONS

This application is a continuation-in-part of the following copending applications: Ser. No. 458,420, filed May 24, 1965, Ser. No. 458,379, filed May 24, 1965, and now abandoned, Ser. No. 479,806, filed Aug. 16, 1965 and now abandoned, the disclosures of which are incorporated herein by reference.

BACKGROUND OF THE INVENTION

Field of the invention

The field to which this invention pertains is the chemistry of hydrated silica pigments and the preparation of masterbatches from natural and/or synthetic rubbery materials, with or without oil, as latex and/or solvent solutions, and aqueous slurries of such silica pigments. Except where otherwise stated, the term "silica pigment" includes hydrated silica pigment and also silica pigments having a content of metal selected from the group consisting of the alkali metals, aluminum, zinc, and the alkaline earth metals, and not exceeding in the aggregate 10% by weight of the pigment, as metal oxide; and the term "slurry" includes aqueous slurries of the silica pigment whether in the absence or in the presence of aqueously dispersed rubbery material.

Description of the prior art

To applicant's knowledge there is not at the present time any elastomer-silica masterbatch being offered on the commercial market. However:

(a) It has been proposed to make masterbatches from elastomer latex and aqueously dispersed silica pigment with the aid of tetraethylene pentamine (Whitby, Synthetic Rubbery, John Wiley & Sons, Inc., New York, 1954, page 676) or glue, gelatin or casein, or by attaching pyridine groups to the elastomer (U.S. Pat. No. 3,004,936).

(b) The so proposed wet masterbatches had high water retentivity resulting in the retention of large volumes of water after filtration, and consequent high drying loads.

SUMMARY OF THE INVENTION (a) The present invention improves wet silica pigment-elastomer masterbatches and masterbatching by treating an alkaline slurry of wet silica pigment containing bound alkali with a specifically controlled amount of selected water soluble metal salt and combining the same to form a masterbatch with measured amounts of elastomer as latex and/or solvent solutions and anionic dispersing agent. The improved masterbatches comprise essentially all the silica solids of the wet silica slurries. Also provided are silica-polar grafted hydrocarbon rubber masterbatches.

(b) The present invention also reduces the water retentivity of wet silica pigment-elastomer masterbatches, including but not limited to those summarized under (a) just above, by mechanically fracturing the structure of the wet silica pigment by high shear mechanical working before masterbatching and/or by freezing and thawing and/or by mechanical pressing between opposed pressing surfaces before or after masterbatching.

DESCRIPTION OF THE PREFERRED EMBODIMENTS

Preferred embodiments of the present invention avoid the use of organic additives such as tetraethylene pentamine, glue, gelatin, casein, etc., which increase the cost and may affect the curing properties of the masterbatch. They do so by either of two methods. The *first* method is characterized by combining, with a solvent solution of the elastomer and a measured amount of anionic dispersing agent, an aqueous slurry of wet silica pigment which initially had a bound alkali content with the serum of the slurry having a limited free alkali content, which slurry has been treated with a controlled amount of water soluble salt of metal selected from the class consisting of aluminum, zinc, and the alkaline earth metals, which amount provides a number of metal cations which at least equals one-half the number of replaceable alkali metal cations of the anionic dispersing agent and which in the aggregate is no greater than 1.5 times the number of replaceable alkali metal cations of the bound alkali content of the silica pigment of the slurry, the *second* method is characterized by combining, with an aqueous dispersion or latex of the elastomer and a measured amount of anionic dispersing agent, an aqueous slurry of wet silica pigment which initially had a bound alkali content with the serum of the slurry having a limited free alkali content, which slurry has been treated with a controlled amount of water soluble aluminum salt, which amount provides a number of metal cations at least equalling one-half the number of replaceable cations of the anionic dispersing agent and in the aggregate no greater than 1.5 times the number of replaceable alkali metal cations of the bound alkali content of the silica pigment of the slurry. In this second method the pH of the serum of the masterbatch, in the presence of the already co-coagulated masterbatch, is preferably adjusted to between 2.5 and 7.5, with the aid of mineral acid and/or salt of metal selected from the group consisting of aluminum, zinc, and the alkaline earth metals. In both these methods the co-coagulum or masterbatch formed comprises all, or essentially all, of the silica pigment of the slurry leaving essentially no silica pigment free in the serum after recovery of the masterbatch therefrom.

In the preferred embodiments the water retentivity of wet silica pigment elastomer masterbatches is reduced by mechanically modifying the structure of the wet silica pigment thereof without causing separation of silica pigment from the masterbatch. This is done in one or more of three ways, each of which mechanically fractures the structure of the wet silica pigment by forces of sufficient intensity to materially reduce its free water retentivity. One of these ways is to subject the wet precursor silica pigment to high shear mechanical working before combining it with the elastomer as latex and/or cement. This way may be practiced (1) before or (2) after a chemical after-treatment of the wet silica pigment. A *second* of these ways is to subject the wet precursor silica pigment to freezing and thawing according to my application Ser. No. 479,806 (supra) either before or after combining it with the elastomer in a wet masterbatch. A *third* of these ways is to subject the precursor wet silica pigment to mechanical pressing between opposed pressing surfaces according to my application Ser. No. 458,379 (supra) either before or after combining it with the elastomer in a wet masterbatch. The improved wet masterbatch produced in the first of these ways may be further improved by treating it in the second and/or third of these ways, and that resulting from the second of these ways of processing may be further improved by treatment in the third of these ways. Since these modes of processing result in a wet masterbatch of reduced free water content, they reduce the amount of water which must be removed by drying of the wet masterbatch, regardless of the particular method of drying employed. The structure fracturing procedures of the invention may be applied with substantial advantage to any precursor wet silica pigment prepared from an aqueous solution of alkali metal silicate and with particular advantages to one which as an undried standard test filter cake has a solids content (dry basis) in the range of 10 to 25% solids by weight. The invention generally may be used to improve wet silica masterbatching and masterbatches using any alkaline slurry of wet silica pigment containing bound alkali by adjustment of the alkali of its serum as herein prescribed when needed, and is applicable to the formation of masterbatches therewith with elastomers generally, which term includes both natural and synthetic elastomers whether curable by sulfur vulcanization or by other processes. Such elastomers include, but are not limited to: natural rubber; diene homopolymer rubbers such as polybutadiene, polyisoprene, polychloroprene; diene copolymer rubbers such as the copolymers of diene monomers and monomers containing and co-polymerizable therewith through a single ethylenically unsaturated group, e.g. butadiene-styrene, butadiene-acrylonitrile, butadiene-methacrylonitrile, butadiene and the acrylates; the vinyl pyridine rubbers set forth in Pat. No. 3,098,837 issued July 13, 1963 to Haxo, herein incorporated by reference; the elastomers set forth in Pat. No. 3,004,936 issued Oct. 17, 1961 to Howland herein incorporated by reference; the Butyl rubbers; the olefin rubbers including ethylene-propylene copolymer rubbers (EP Rubbers) and ethylene-propylene terpolymer rubbers (EPT Rubbers); the fluorine and/or chlorine containing elastomers; hydrocarbon rubbers grafted with polar monomers, especially those containing nitrogen; and indeed all elastomeric materials capable of being reinforced by silica pigment, as well as mixtures and combinations thereof with processing oils, commonly referred to as oil-rubber masterbatches, and any of the foregoing further including other compounding ingredients such as carbon-black providing the silica pigment comprises an essential component of the wet silica-elastomer masterbatch.

SILICA PIGMENT FOR MASTERBATCHING

Silica pigments prepared by the acidulation of aqueous solutions of alkali metal silicate are known and have been used, inter alia, as pigments for the reinforcement of natural and synthetic rubbers.

In copending applications Ser. Nos. 458,131 and 458,-132 I have disclosed that the filterability of a slurry of silica pigment produced by the acidulation of an aqueous solution of alkali metal silicate may be improved by conducting at least the critical part of the acidulation in the substantial absence of any significant shear. As therein described, the filter cake from such a slurry has augmented free water retentivity, filters rapidly, and washes rapidly on the filter, thus effecting a substantial saving in the time of filtration compared to previously known processes but the filter cake so produced contains only about 9% to 14% solids as an undried cracked standard test filter cake prepared as hereinafter described, i.e. from about 10 parts to 6 parts, usually 9 to 7 parts, of water for each part of silica therein, by weight, dry basis.

The present invention as disclosed in my copending application Ser. No. 458,420 of which the present application is a continuation in part, is rested on my discovery that the free-water retentivity of wet master-batch prepared from an elastomer and wet silica pigment produced by the acidulation of alkali metal silicate—whether such pigment is produced either in accordance with prior art processes which afford fair filterability or in accordance with said copending applications Ser. Nos. 458,131 and 458,132 which afford better filterability—may have its free water retentivity reduced to a substantial extent by subjecting the precursor wet silica pagment to mechanical fracture, as by rupture by high shear dynamic impact, sufficiently intense to modify the structure of the water-carrying silica pigment and lower its free water retentivity; and on my discovery that while the reduction in the free water retentivity of the wet silica pigment by the methods of my aforesaid applications permits the wet silica pigment to pack to a dense cake on a filter, rendering its filtration slower and rendering the washing of the filter cake more difficult, this is not a drawback since the wet silica pigment of mechanically fractured structure is particularly useful for masterbatching with elastomer, and indeed that its recovery in this fashion greatly reduces the amount of water necessary to be removed in drying of the wet masterbatch as compared to wet masterbatches prepared from the precursor silica pigment which has not been subjected to the fracture of its structure.

PREPARATION OF STANDARD TEST FILTER CAKE

The free water retentivities of silica pigments and their elastomer masterbatches are readily measured and compared by the amounts of free water they retain in the form of undried cracked standard test filter cakes. The standard test used herein and in my aforesaid copending cases, is made at room temperature (25° C.), with a Büchner funnel type filter having a $\frac{1}{10}$ square foot filter area, using filter cloth, e.g. nylon filter cloth, in place of filter paper, and employing a vacuum of 25±0.2 inches of mercury. Herein, enough of the slurry of the silica pigment (or the aqueous slurry of coagulated wet silica-elastomer masterbatch) was supplied to form a filter cake which had a thickness when it first cracked of about ½ inch.

The silica pigment (or masterbatch) thus reduced to an undried cracked standard filter cake is removed from the filter and the weight ratio of occluded free water to the solids, dry basis, is determined by weighing a portion of the cake, drying it to constant weight, e.g. at 105° C. in a laboratory oven, weighing the resulting dry solids, and determining the occluded free water by difference. As previously indicated, the wet precursor silica pigment employed in practicing the present invention may have a free water retentivity such that in the undried cracked standard filter cake it retains occluded free water in the range of about 1.5 to 9 parts of occluded water per part of silica pigment (dry basis) by weight.

In the practice of the present invention using high shear mechanical working for effecting the mechanical facture of the wet silica pigment structure a slurry of the said wet precursor silica pigment, especially after same has been substantially freed of electrolyte as by decantation and/or filtering and washing, is subjected to high shear mechanical working of sufficient intensity to break down the water occluding structure of the silica pigment by an amount such that the resulting wet silica pigment product as an undried cracked standard test filter cake, has a solids content, dry basis by weight, increased by at least 15% over that of said precursor wet silica pigment. Preferably the high shear mechanical working produces a wet silica pigment having a dry solids content by said standard test, in the range of 25–40%.

The high shear mechanical working of the slurry may be effected by suitable high shear mixing equipment. Such equipments include, in laboratory scale, the Waring Blendor, and like high shear mixers, and in the case of larger scale operations, the high power, high speed, high shear mixers having saw-tooth-edged impellers (produced by Special Machinery Co. and by Patterson Industries, for example) those having slotted high shear impellers such as the Dispersator (produced by Premier Mill Corporation), those having high shear star-blades, such as the Chemsear unit (produced by Chemineer), those having saw-tooth-edged modified turbine impellers (for example that produced by J. H. Day Co.), those having single and multiple stators in association with their rotary parts such as the Gifford-Wood Co. Homogenizer, and the Gabb Special Products modified turbine-high-shear mixer having a single stationary blade and two rotors adjacent the same, and those having high shear impellers on counter-rotating shafts (produced by J. H. Day Co. for example). High shear mixers of these types, as known to those skilled in the mixing art, are most effective when employed in confining chambers or with baffles, e.g., in the known high shear in-line mixers or blenders (of Gabb Special Products, Gifford-Wood Co., Premier Mill, Rietz Manufacturing Co., Mixing Equipment Co., and Chemineer, for example) and the Nettco Flowmix blender. Other high shear mixing devices such as colloid mills may also be used.

The time required to effect the processing of the wet procursor silica pigment in this manner varies somewhat with the structure of the silica and the nature of the high shear mixer employed. In general, application of high shear working from about ½ to 20 minutes, preferably 5 to 10 minutes, effect from 15 to 100% or more increase in the solids content of the wet silica pigment filter cake as evaluated by the standard test.

In the practice of the process of the present invention, using freezing and thawing for effecting the mechanical fracture of the wet silica pigment structure or a part thereof, the said wet precursor silica pigment either in the absence of or in the presence of the elastomer or as latex or solvent solutions is subjected to freezing and thawing.

In one embodiment of the invention the wet silica pigment before being masterbatched is subjected to freezing and thawing in the form of a wet filter cake.

In another embodiment of the invention the precursor wet silica pigment before being masterbatched is reduced to the form of a wet filter cake and then subjected to fluidizing by mechanical working as described in copending application Ser. No. 458,420 before it is subjected to the freezing and thawing steps, the mechanical working being effected under conditions of high shear.

In the practice of the process the freezing and thawing steps compact the wet silica pigment either in the absence of or in the presence of the elastomer and render supernatant thereto part of the water occluded thereby before such freezing and thawing treatment (hereinafter called "freeze treatment"), which facilitates the separation of the compacted wet silica pigment or masterbatch from such supernatant water.

In the practice of the present invention using pressing between opposed pressure plates for effecting the mechanical fracture of the wet silica pigment structure or a part thereof, the said wet precursor silica pigment in the absence of or in the presence of the elastomer is confined in a segregated body having provision for flow of released liquid therefrom, and to opposed surfaces of said body mechanical pressure is applied of sufficient intensity to break down the water occluding structure of the silica pigment to thus reduce its free water retentivity and release previously occluded free water therefrom, the mechanical pressure being maintained for a sufficient time to enable flow of the so released water from the body. These steps may be effected by wrapping the wet silica in a foraminous or reticulated wall such as canvas or filter cloth and placing such wrapped cake within the surrounding rectangular wall of a so-called picture frame mold and between relatively movable top and bottom pressure plates, and applying a load to the upper plate to produce relative movement between the plates for effecting the break-down of the water occluding structure by the slow compression of the structure as the released occluded water is expressed. Alternatively, the wet precursor silica pigment or its masterbatch may be confined within a suitably backed up cylindrical screen or other foraminous or reticulated wall between plungers at least one of which is movable relative to the other to break the silica structure, the released water flowing through the foraminations or reticulations of the screen or wall, the non-compressibility of the liquid controlling the rate and degree of crushing of the silica structure.

The pressures found suitable range from 100 to 1000 pounds per square inch of the surface to which the mechanical pressure is applied. Such suitable pressures effect quite large reduction in the free water retentivity of the wet silica pigment in moderate intervals of time. Where holdup time is less critical, then lower pressures, e.g. down to 50 p.s.i. or lower, may sometimes be employed. In general, application of a pressure from 2 to 20 minutes suffices to release and permit flow from the body of wet silica pigment or of wet silica pigment masterbatch of substantially all the water releasable by the reduction of structure and water retentivity effected by a given crushing pressure.

The above general features of the invention, and features contributory thereto in particular embodiments, will be more fully understood by reference to the following examples of procedures and products embodying the invention.

EXAMPLE 1

The precursor silica pigments for the following Examples 1a through 1d were prepared in a concrete reactor according to my copending application Ser. No. 458,483, filed May 24, 1965, using low shear agitation according to my U.S. application Ser. No. 418,131, filed May 24, 1965, and employing a submerged combustion burner in accordance with my U.S. application Ser. No. 458,132, filed May 24, 1965, and further utilizing the rate change procedure in accordance with U.S. Pat. No. 3,250,594.

Charged to the reactor were 405 lbs. of 41° Bé. aqueous sodium silicate containing alkalinity 8.9% as $Na_2O$ and 27.7% $SiO_2$, and also charged were 1800 lbs. of water, and the temperature was raised to 70° C. and maintained at that value. Carbon dioxide as acidulating agent was introduced at a constant rate for 220 minutes, at which time the Tyndall effect appeared, and the constant rate was then doubled, and after 555 minutes the acidulation achieved was 102% of that theoretically necessary to convert the alkalinity to $Na_2CO_3$, and thereafter over a period of four hours addition of carbon dioxide was continued, raising the achieved acidulation to approximately 120% of theoretical, conditions of low shear agitation being maintained throughout.

The resulting silica pigment slurry was filtered and washed, yielding a filter cake containing 11% solids, dry basis. A sample of this filter cake slurried with an equal weight of water was filtered and the filtrate had a resistivity of 1250 ohm-centimeters. A 1440 gram portion of this washed and untreated cake was employed in Example 1d following.

For use in Examples 1a, 1b and 1c a 5450 gram portion of this washed filter cake containing 600 grams of silica pigment, dry basis, was slurried with 500 ml. of water and 150 ml. of 10% sulfuric acid was added, resulting in a pH of 7.0 of the aqueous serum of the silica slurry. There were then added to this slurry 150 ml. of a 10% aqueous solution of aluminum sulfate as $$Al_2(SO_4)_3 \cdot 12H_2O$$

The resulting slurry had a pH of the liquid of 4.0, and on filtering produced a wet cake containing 12.8% solids, dry basis, i.e. a cake containing 6.84 parts of retained free water for each part of pigment, dry basis.

EXAMPLE 1a—(CONTROL)

Wet silica pigment-elastomer-masterbatch from wet silica pigment prepared with low shear agitation To 1440 grams of the after-treated wet silica pigment batch from Example 1 was added 1260 grams butadiene-styrene latex 19.8% solids (SB–R 1502 which comprises about 5 parts of anionic emulsifier per 100 of rubber) and after stirring a few minutes with a low-shear agitation paddle the rubber latex and silica coagulated and the pH was between 5.0 and 5.5. Then there were added 25 ml. of 10% antioxidant 2246 (2.2′-methylene-bis(4-methyl-6-tert-butyl-phenol)) in isopropanol and then 200 ml. of 10% aqueous aluminum sulfate $(Al_2(SO_4)_3.12H_2O)$ and the rubber-silica co-coagulum then precipitated to form curds with no free silica in the serum. The wet masterbatch was filtered to form a cracked filter cake weighing 1936 grams and after drying the rubber-silica masterbatch weighed 392 grams. The dry solids content of the wet cracked filter cake was 20.1% by weight, i.e. the cake contained 3.97 parts of retained water (serum) per part of masterbatch, dry basis by weight.

EXAMPLE 1b

Wet silica pigment-elastomer masterbatch prepared from wet silica pigment after mechanical fracturing thereof An amount of 1440 grams of the after-treated wet silica pigment batch from Example 1 was placed in a one gallon Waring Blendor and agitated 1 minute at medium speed and then 9 minutes at high speed. The masterbatch with this wet silica pigment of mechanically fractured structure was prepared in the same manner as that of Example 1a by adding 1260 grams of SB–R 1502 latex, 25 ml. of 10% antioxidant 2246 and 200 ml. of 10% aqueous solution of aluminum sulfate. The masterbatch was filtered and the filtrate was free of silica. The masterbatch cracked filter cake weighed 1345 grams and after drying the rubber-silica masterbatch weighed 390 grams. The dry solids content of the wet masterbatch cracked filter cake was 29.0% by weight, i.e. this cake contained only 2.45 parts of retained free water per part of masterbatch dry basis by weight. Thus the processing of Example 1b reduced the free water to be removed by drying from 3.97 to 2.45 parts by weight, i.e. a reduction of over 38% of the drying load.

The application of high shear to effect the mechanical fracturing of the silica structure may be made either prior to or following the chemical after-treatment of the silica pigment, but must precede the addition of the rubber latex if a masterbatch is to be obtained containing essentially all the web silica pigment and leaving the serum essentially free of silica pigment, and aqueous dispersions or latices of other rubbers, e.g. butadiene-acrylonitrile rubbers, chloroprene, natural rubber, butadiene-acrylate rubbers, etc., may be employed in lieu of the butadiene-styrene latex of this example.

EXAMPLE 1c

Wet silica pigment elastomer solution masterbatch from wet silica pigment after mechanical fracturing thereof A 1440 gram portion of the after-treated wet silica pigment from Example 1 is subjected to mechanical fracture by 10 minutes agitation in the Waring Blendor at high speed setting. To the resulting processed wet silica pigment is then added while mixing 18.5 grams of sodium oleate dispersed in 300 ml. of water, and 370 grams, dry basis, of rubber in solvent solution which has been prepared by mixing for 24 hours 370 grams of sheeted out butyl rubber (Thiokol Type 165) and 6500 grams of methylene chloride and 5 grams of antioxidant 2246 and homogenizing the same for 3 minutes in the Waring Blendor at high speed setting. To recover the masterbatch the wet silica pigment slurry rubber-solvent blend is run into 3 liters of boiling water which flashes off the methylene chloride for recovery, and the resulting wet masterbatch collects on the surface of the water and is removed and dried, with a comparable saving in drying load resulting from the mechanical fracturing of the wet silica pigment prior to masterbatching.

EXAMPLE 1d

Wet silica pigment elastomer solution masterbatch from mechanically fractured wet silica pigment In the Waring Blendor, a 1440 gram portion of the untreated filter cake of Example 1 was mechanically fractured at high speed setting for 10 minutes and 58 ml. of 10% sulfuric acid was then added, resulting in a serum pH of 4.0. Ten (10) grams of the cationic emulsifier octadecyltrimethylammonium chloride (50% active) was mixed with the silica slurry and 370 grams dry basis of butyl rubber in the same solvent solution employed in Example 1c. The masterbatch was recovered in the same manner as in Example 1c, and the saving in drying load resulting from the mechanical fracturing of the wet silica pigment was of the same order.

In the foregoing Examples 1c and 1d the butyl rubber solution may be replaced by solutions of other elastomers in suitable solvents, especially hydrocarbon elastomers prepared in solvents such as ethylene-propylene terpolymers, polyisoprene, polybutadiene, butadiene-styrene copolymers, etc.

EXAMPLE 2

Example 1 was repeated producing 5450 grams of washed and untreated wet precursor silica pigment filter cake having a pH of 10.5 and containing 11% total solids, or 600 grams of silica pigment dry basis. This cake was treated with 150 ml. 10% sulfuric acid as in Example 1, producing a pH of 7.0. It was then treated with 150 ml. of 10% aluminum sulfate as in Example 1. The treated silica slurry thus prodced had a pH of 3.5 of the serum and a weight of 5750 grams.

EXAMPLE 2a—CONTROL

Example 1a was repeated using 1435 grams of the slurry produced in Example 2 with the 1260 grams of SB–R 1502 latex (T.S. 19.8%), and filtering the masterbatch at 15″ vacuum, until the cake cracked. A portion of the wet masterbatch filter cake thus produced was dried at 105° C. to constant weight establishing that the wet masterbatch so produced contained 19.0% solids (dry basis), corresponding to 4.25 parts water per part of masterbatch, dry basis.

EXAMPLE 2b

Mechanical fracture of structure by freezing and thawing wet silica pigment-elastomer masterbatch A 1000 grams portion of the wet masterbatch produced by Example 2a was frozen for 6 hours in the freezing compartment of a domestic refrigerator and then allowed to thaw overnight and refiltered (15″ vacuum as before) until the filter cake cracked. The wet cake then weighed 638 grams and on drying to constant weight 188 grams, i.e. had a dry solids content of 29.5%, corresponding to 2.38 parts water per part of masterbatch, dry basis. Thus the freezing and thawing treatment reduced the drying load from 4.25 to 2.38 parts of water, a reduction in drying load of 1.87 parts out of 4.25, or 44%.

EXAMPLE 2c

Mechanical fracture of structure by freezing and thawing of wet silica pigment before forming wet masterbatch A 1435 gram portion of the wet silica pigment produced by Example 2 above was placed in a polyethylene bag and frozen for 6 hours in the freezing compartment of the domestic refrigerator, and then allowed to thaw overnight, and Example 1a was then repeated using the contents of the said bag which had been frozen and thawed instead of the wet silica pigment which had not been so treated. The resulting masterbatch, when filtered at 15″ vacuum, gave a wet cake weighing 1585 grams, and having a dry solids content of 26.2%. The freeze treatment of the wet silica pigment used in forming the masterbatch thus increased the masterbatch solids from 19% to 26.2%, i.e. reduced the drying load for drying the masterbatch from 4.25 parts to 2.80 parts, a reduction in drying load of over 34%.

EXAMPLE 3a

Mechanical fracture of structure by compression load on wet silica pigment prior to masterbatching A 1435 gram portion of the treated silica pigment wet filter cake produced by Example 2 was wrapped in filter cloth and placed in the 9″ x 9″ steel picture frame mold and squeezed at 384 p.s.i. (3100 pounds total applied pressure). It took 2½ minutes to build up to the 384 p.s.i. and this pressure was held for 6 minutes. The resulting cake weighed 395 grams.

The 395 gram body of the thus fractured wet cake was slurried in 1 liter of water (1 minute in the Waring Blendor) and added to 1260 grams of SB–R 1502 Latex (T.S.=19.8%, or 250 grams). A 25 ml. portion of 10% Antioxidant 2246 in isopropanol was added and some co-coagulum formed, and the pH was between 5.0 and 5.5. A 200 ml. quantity of 10% $Al_2(SO_4)_3 \cdot 12H_2O$ was added and the masterbatch formed curds leaving the serum free of silica pigment. The curds were filtered until the cake cracked. The wet masterbatch cake thus formed weighed 1375 grams and contained 435 grams or 31.5% solids (dry basis). The masterbatch of the control, Example 2a, contained 19% total solids while that of this example contained 31.5% total solids, dry basis. The drying load was thus reduced from 4.25 parts of water to 2.17 parts, per part of masterbatch, dry basis, a reduction in drying load of 49%.

EXAMPLE 3b

Wet silica pigment-graft elastomer latex masterbatch pressed between opposed pressing surfaces for fracturing its pigment structure To the reactor employed in Example 1 hereof, and operated at 30° C., was added 270 lbs. of "N" type sodium silicate solution containing alkalinity in the amount of 175 moles (as $Na_2O$) in ratio of $Na_2O/(SiO_2)_{3.22}$ and 166 gallons of water. Electrolyte comprising 26.7 grams of sodium chloride dissolved in 35.6 gallons of water was added over a period of 180 minutes. The acidulation with carbon dioxide was commenced and continued concurrently with the addition of electrolyte and continuing to 120% of the quantity theoretically necesary to convert the alkalinity as $Na_2O$ to $Na_2CO_3$, at which point the total acidulation time was 480 minutes. The resulting wet silica pigment slurry was filtered and washed to a resistivity of more than 1000 ohm-centimeters.

To 9420 grams of the wet filter cake (600 grams silica dry basis) was added 7 liters of water and the pH was 10.5. This slurry was agitated 3 minutes in the Waring Blendor and 105 grams of 20% sulfuric acid was added which reduced the pH to 7.0. This silica pigment slurry was added to a graft rubber latex. The graft rubber latex was prepared as follows: To 6190 grams of butadiene-styrene latex (SB–R 1502) containing 1200 grams solids dry basis, was added 4.5 liters of water, 36 grams 2-vinylpyridine, 3.6 grams cumene hydroperoxide, 1.4 grams tetraethylenepentamine, and the graft polymerization was allowed to proceed to substantial completion which took 5.5 hours at 60° C. and to short-stop the reaction 10 ml. of 15% aqueous potassium dimethyldithiocarbamate was added.

The silica pigment slurry and the batch of graft rubber latex so prepared coagulated on combining, and was converted to curds by the addition of 1180 ml. of 10% aluminum sulfate $(Al_2(SO_4) \cdot 12H_2O)$ and 63 grams of 33% Antioxidant 2246 isopropanol was added and the masterbatch filtered and washed and the yield of cracked filter cake was 10,320 grams, which contained 1810 grams of dry solids, i.e. a solids content of 17.5% corresponding to 4.7 pts. retained water to 1 part masterbatch, dry basis.

The 10,320 grams of wet filter cake masterbatch was wrapped in two layers of filter cloth and placed in a rectangular steel picture mold, and pressed between pressure plates at 250 p.s.i. pressure. A screen was interposed between the picture mold and bottom plate to provide for escape for the water released by the crushing of the masterbatched silica pigment structure. Two to three minutes were used in bringing the pressure up to the full pressure value applied during the 10 minute pressing period.

The pressed filter cake weighed 4965 grams, and on drying yielded 1810 grams of dry masterbatch, i.e. contained 36.4% solids, dry basis, corresponding to 1.75 parts water per part of masterbatch, dry basis. The drying load was thus reduced by 62½% by the mechanical fracturing of the wet silica pigment structure.

A portion of the masterbatch thus formed was subjected to Banbury mixing with antioxidant as follows:

| | Parts |
|---|---|
| Masterbatch | 1400 |
| Antioxidant #2246 | 28 | and attained a temperature of 280° F. after 5 minutes of mixing, and of 400° F. after 3 more minutes of mixing. It was then transferred to the rubber mill and compounded as follows:

Recipe:

| | Parts |
|---|---|
| Banbury batch | 150 |
| Cumar resin, RH | 2.5 |
| Reogen | 5 |
| Magnesia | 4 |
| Zinc oxide | 5 |
| Altax | 0.75 |
| DOTG | 1.5 |
| Sulfur | 2 |
| Triethanolamine | 1 |

After curing at 287° F. for 120 minutes the vulcanizate had the following physical properties:

| | |
|---|---|
| 300% modulus, p.s.i. | 1395 |
| Ult. tensile, p.s.i. | 4695 |
| Elongation, percent | 615 |
| Hardness, Shore A | 71 |

It will be noted that the 62½% reduction in drying load in this example was effected as compared to a masterbatch prepared with silica pigment which had been subjected to high shear agitation for three minutes in the Waring Blendor. A comparison with a like masterbatch prepared from the same wet silica pigment which has not been subjected to mechanical fracture of its structure, would show an even greater reduction of drying load.

Other polar vinylidene (which term includes vinyl) monomers can be substituted for the 2-vinyl-pyridine of this example, and other precursor hydrocarbon rubbers may be substituted for the SB–R 1502 of this example Especially suitable are those polar vinylidine monomers having silico-, i.e. siloxane groups, or primary, secondary, tertiary or quaternary amine groups, in suitable amounts, preferably 0.5 to 5.0 parts of polar monomer per 100 parts of precursor elastomer. The polar grafted polymers, resulting from such substitutions, as is exemplified by the present example, are particularly suited for reinforcement with silica pigments. Especially suitable precursor hydrocarbon polymers are the solution-prepared polybutadienes, polyisoprenes, butadiene-styrene copolymers, ethylene-propylene copolymers (EP - polymers), ethylene-propylene terpolymers (EPT-polymers) and butyl rubbers, all of which can be solution grafted with the above proportions of polar monomers, by e.g. the same recipe set forth in this example, and the grafted polymers and silica pigment may be recovered as a masterbatch in the manner set forth in Examples 1c and 1d. The hydrocarbon polymers thus can be benefitted by such grafting for cooperation with reinforcing silicia pigment, especially when the latter has been treated with an acid or acidic salt.

All of the foregoing examples may also be practiced in the presence of processing oils to obtain oil extended elastomer-silica pigment masterbatches.

While there have been described herein what are at present considered preferred embodiments of the invention, it will be obvious to those skilled in the art that modifications and changes may be made therein without departing from the essence of the invention. It is therefore understood that the exemplary embodiments are illustrative and not restrictive of the invention, the scope of which is defined in the appended claims, and that all modifications that come within the meaning and range of equivalents of the claims are intended to be included therein.

I claim:
1. A process for preparing a masterbatch of high solids content from wet silica pigment and elastomer which consists essentially of:
   (a) preparing a precursor wet silica pigment from an aqueous solution of alkali metal silicate, which precursor wet silica pigment as an undried cracked standard test filter cake has a solids content (dry solids basis) in the range of about 10 to 25% by solids weight,
   (b) subjecting said wet precursor silica pigment to mechanical fracturing of sufficient intensity to modify its water retentivity to an extent such that as such standard test filter cake it has a solids content (dry solids basis) increased by at least 15% over that of said precursor wet silica pigment,
   (c) masterbatching the modified wet silica pigment produced by step (b) with aqueously dispersed elastomer, and
   (d) recovering said modified wet silica pigment with the elastomer as wet masterbatch ready for drying,
   (e) the so recovered wet masterbatch having a high solids content related to the reduced water retentivity of the wet silica pigment resulting from step (b), whereby the amount of water required to be removed by drying of such masterbatch is reduced.

2. A process as defined in claim 1, wherein the mechanical fracturing of step (b) is accomplished by subjecting the wet precursor silica pigment to high shear mechanical working followed by freezing and thawing.

3. A process as defined in claim 1, wherein the mechanical fracturing of step (b) is accomplished by subjecting the wet precursor silica pigment to high shear mechanical working followed by mechanical pressing between opposed pressing surfaces.

4. A process as defined in claim 1, wherein the mechanical fracturing of step (b) is accomplished by subjecting the wet precursor silica pigment to freezing and thawing.

5. A process as defined in claim 1, wherein the mechanical fracturing of step (b) is accomplished by subjecting the wet precursor silica pigment to mechanical pressing between opposed pressing surfaces.

6. A process as defined in claim 1, wherein the mechanical fracturing of step (b) is accomplished by subjecting the wet precursor silica pigment to high shear mechanical working.

7. A process according to claim 6, further comprising the step of expressing water from the wet masterbatch by mechanical pressing during step (d).

8. A process according to claim 6, further comprising the step of freezing and thawing the wet masterbatch during step (d).

9. A process for preparing a masterbatch of high solids content from wet silica pigment and elastomer which consists essentially of:
   (a) preparing a precursor wet silica pigment from an aqueous solution of alkali metal silicate, which precursor wet silica pigment as an undried cracked standard test filter cake has a solids content (dry solids basis) in the range of about 10 to 25% solids by weight,
   (b) subjecting said wet precursor silica pigment to mechanical fracturing of sufficient intensity to modify its water retentivity to an extent such that as such standard test filter cake it has a solids content (dry solids basis) increased by at least 15% over that of said precursor wet silica pigment,
   (c) blending the modified wet silica pigment produced by step (b) with a solvent solution of elastomer, and
   (d) recovering the solids from the blend as a dry masterbatch.

References Cited

UNITED STATES PATENTS 2,863,727   12/1958   Thornhill et al. _____ 23—182
3,250,594   5/1966    Burke et al. _____ 23—182

MURRAY TILLMAN, Primary Examiner

W. J. BRIGGS, Sr., Assistant Examiner

U.S. Cl. X.R.

23—182; 260—34.2, 41.5, 879